US011543622B2

(12) United States Patent
Park

(10) Patent No.: US 11,543,622 B2
(45) Date of Patent: Jan. 3, 2023

(54) LENS DRIVING APPARATUS, CAMERA MODULE, AND OPTICAL DEVICE

(71) Applicant: LG INNOTEK CO., LTD., Seoul (KR)

(72) Inventor: Jae Keun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 263 days.

(21) Appl. No.: 16/636,970

(22) PCT Filed: Aug. 7, 2018

(86) PCT No.: PCT/KR2018/008966
§ 371 (c)(1),
(2) Date: Feb. 6, 2020

(87) PCT Pub. No.: WO2019/031817
PCT Pub. Date: Feb. 14, 2019

(65) Prior Publication Data
US 2021/0149150 A1    May 20, 2021

(30) Foreign Application Priority Data

Aug. 7, 2017 (KR) .......................... 10-2017-0099408

(51) Int. Cl.
*G02B 7/09* (2021.01)
*G02B 27/64* (2006.01)
(Continued)

(52) U.S. Cl.
CPC ............. *G02B 7/09* (2013.01); *G02B 27/646* (2013.01); *G03B 5/00* (2013.01); *G03B 13/36* (2013.01);
(Continued)

(58) Field of Classification Search
CPC .. G02B 5/00; G03B 13/36; G03B 2205/0007; G03B 2205/0053; G03B 3/02;
(Continued)

(56) References Cited

U.S. PATENT DOCUMENTS 10,848,656 B2    11/2020   Park et al.
2012/0082442 A1   4/2012   Kwon et al.
(Continued)

FOREIGN PATENT DOCUMENTS

CN    101266386 A    9/2007
CN    104793444 A    7/2015
(Continued)

*Primary Examiner* — Marin Pichler
(74) *Attorney, Agent, or Firm* — Birch, Stewart, Kolasch & Birch, LLP

(57) ABSTRACT

The present embodiment relates to a lens driving device, a camera module and an optical apparatus, the lens driving device comprising: a first housing; a second housing; a bobbin; an aperture; a first coil, a second coil, a third coil, and a fourth coil; a first magnet; a second magnet; a third magnet; and a fourth magnet, wherein the first coil, the second coil, the third coil, and the fourth coil are disposed to be spaced apart from each other; the first coil and the third coil are disposed opposite to each other with the first magnet and the third magnet interposed therebetween; and the second coil and the fourth coil are disposed opposite to each other with the second magnet and the fourth magnet interposed therebetween.

20 Claims, 5 Drawing Sheets

(51) Int. Cl.
*G03B 13/36* (2021.01)
*G03B 5/00* (2021.01)
*H02K 7/08* (2006.01)
*H02K 11/215* (2016.01)
*H02K 41/035* (2006.01)
*G02B 7/08* (2021.01)

(52) U.S. Cl.
CPC ........ *G02B 7/08* (2013.01); *G03B 2205/0007* (2013.01)

(58) Field of Classification Search
CPC . G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 41/0356
USPC ....... 359/911, 554, 555, 557, 811, 813, 814, 359/824, 872, 877
See application file for complete search history.

(56) References Cited

U.S. PATENT DOCUMENTS

| | | | |
|---|---|---|---|
| 2012/0200176 A1 | 8/2012 | Park | |
| 2014/0362284 A1* | 12/2014 | Shin | H04N 5/2254 348/373 |
| 2015/0103195 A1 | 4/2015 | Kwon et al. | |
| 2016/0252746 A1 | 9/2016 | Kim et al. | |
| 2016/0341975 A1* | 11/2016 | Kim | G03B 3/10 |
| 2017/0052388 A1 | 2/2017 | Kim et al. | |
| 2017/0139225 A1 | 5/2017 | Lim | |
| 2017/0195530 A1 | 7/2017 | Chen et al. | |
| 2017/0324892 A1 | 11/2017 | Kim et al. | |
| 2018/0003915 A1* | 1/2018 | Shin | H04N 5/2254 |
| 2018/0095341 A1* | 4/2018 | Lee | H04N 5/2257 |
| 2018/0284571 A1* | 10/2018 | Park | H04N 5/2252 |
| 2019/0020797 A1* | 1/2019 | Park | G02B 13/001 |
| 2019/0049692 A1* | 2/2019 | Choi | H04N 5/23212 |

FOREIGN PATENT DOCUMENTS

| | | | | |
|---|---|---|---|---|
| CN | 106094160 A | 11/2016 | | |
| CN | 106707454 A | 5/2017 | | |
| CN | 106716242 A | 5/2017 | | |
| JP | 2015-18050 A | 1/2015 | | |
| JP | 2017-90887 A | 5/2017 | | |
| KR | 10-1085645 B1 | 11/2011 | | |
| KR | 10-2012-0097117 A | 9/2012 | | |
| KR | 10-2012-0133904 A | 12/2012 | | |
| KR | 10-1273793 B1 | 6/2013 | | |
| KR | 10-2015-0042690 A | 4/2015 | | |
| KR | 10-2015-0127792 A | 11/2015 | | |
| KR | 10-2015-0138749 A | 12/2015 | | |
| KR | 20150138749 A | * 12/2015 | ............ | G03B 9/06 |
| KR | 10-2016-0020768 A | 2/2016 | | |
| KR | 10-1659395 B1 | 9/2016 | | |
| KR | 10-2016-0120472 A | 10/2016 | | |
| KR | 10-1700771 B1 | 1/2017 | | |
| KR | 10-2017-0056387 A1 | 5/2017 | | |
| KR | 20180092206 A | * 8/2018 | ............ | G03B 7/085 |
| KR | 20180114296 A | * 10/2018 | ............ | G03B 13/22 |

* cited by examiner

[Fig. 3]
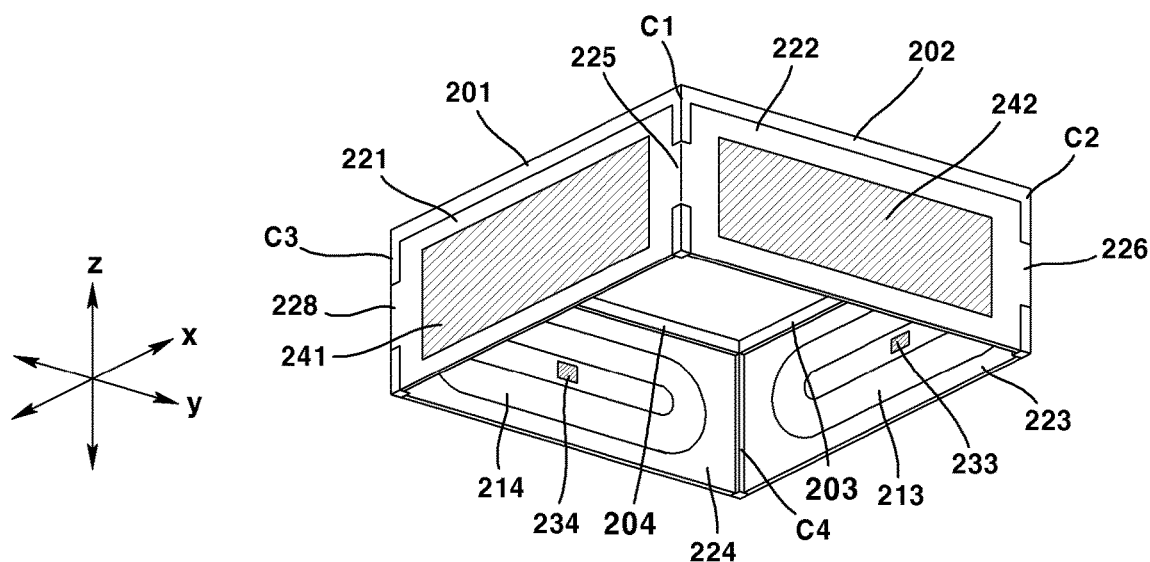
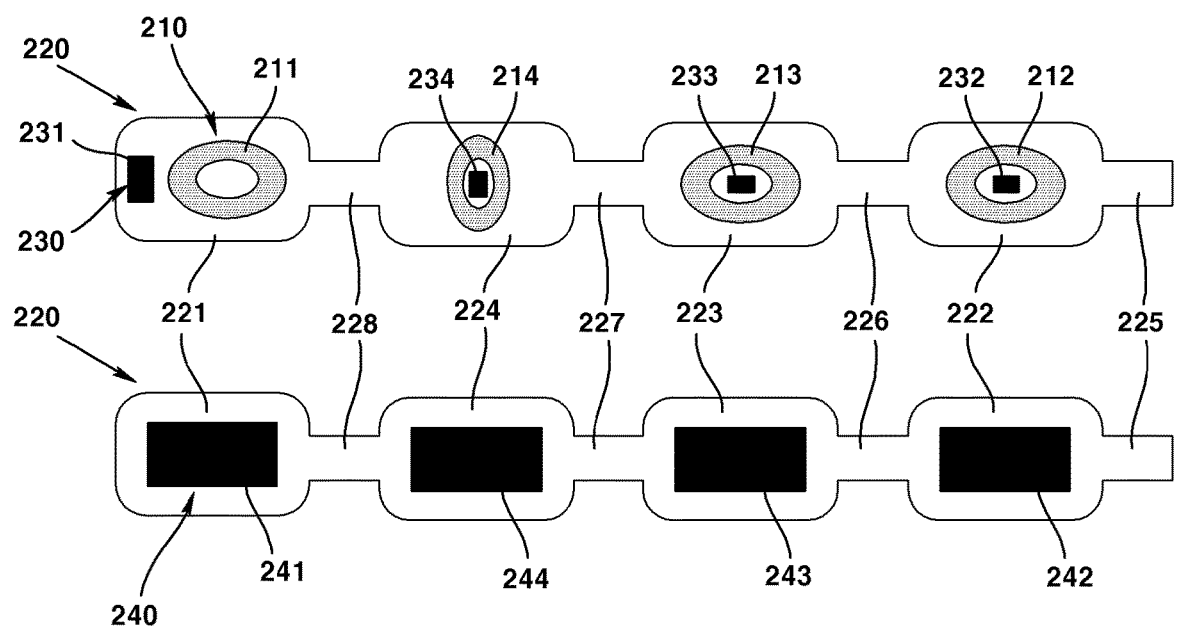

LENS DRIVING APPARATUS, CAMERA MODULE, AND OPTICAL DEVICE

CROSS REFERENCE TO RELATED APPLICATIONS

This application is the National Phase of PCT/KR2018/008966 filed on Aug. 7, 2018, which claims priority under 35 U.S.C. § 119(a) to Patent Application No. 10-2017-0099408 filed in the Republic of Korea on Aug. 7, 2017, all of which are hereby expressly incorporated by reference into the present application.

TECHNICAL FIELD

The present embodiment relates to a lens driving device, a camera module and an optical apparatus.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

A camera module is one of the representative items that capture a subject in a picture or a video. Recently, a camera module has surfaced having an auto focus function which is a function automatically adjusting a focus in response to a distance to an object, and having an OIS function moving or tilting a lens module to a direction perpendicular to an optical axis in order to offset vibrations (movements) generated on an image sensor by an external force.

Meantime, an aperture is a device adjusting an amount of light passing through a lens module by adjusting a size of a hole.

The conventional camera module suffers from disadvantages in that structure thereof is complicated because an auto focus function, an OIS (Optical Image Stabilization) function and an aperture driving function are performed by separate driving members.

DETAILED DESCRIPTION OF THE INVENTION

Technical Subject

The present embodiment provides a compact-structured lens driving device configured to perform an auto focus function, an OIS function and an aperture driving using a single driving member, a camera module and an optical apparatus.

Technical Solution

A lens driving device according to an exemplary embodiment of the present invention comprises: a first housing; a second housing disposed at an inside of the first housing; a bobbin disposed at an inside of the second housing; an aperture disposed on the bobbin or disposed at the bobbin; a first coil, a second coil, a third coil, and a fourth coil disposed on the first housing; a first magnet disposed on the second housing and disposed opposite to the first coil; a second magnet disposed on the bobbin and disposed opposite to the second coil; a third magnet disposed on the bobbin and disposed opposite to the third coil; and a fourth magnet disposed on the aperture and disposed opposite to the fourth coil, wherein the first coil, the second coil, the third coil, and the fourth coil are disposed to be spaced apart from each other; the first coil and the third coil are disposed opposite to each other with the first magnet and the third magnet interposed therebetween; and the second coil and the fourth coil are disposed opposite to each other with the second magnet and the fourth magnet interposed therebetween.

The first housing may comprise: a first corner, a second corner, a third corner and a fourth corner, each mutually spaced apart from the other; a first connection part connecting the first corner and the second corner; a second connection part connecting the second corner and the third corner; a third connection part connecting the third corner and the fourth corner; and a fourth connection part connecting the four corner and the first corner, wherein the first coil may be disposed on the first connection part, the second coil may be disposed on the second connection part, the third coil may be disposed on the third connection part and the fourth coil may be disposed on the fourth connection part.

The lens driving device may further comprise a board disposed at an inside with the first coil, the second coil, the third coil and the fourth coil, wherein the board may be disposed on the first connection part, the second connection part, the third connection part and the fourth connection part.

The board may comprise a first board disposed on the first connection part and disposed at an inside with the first coil, the second board disposed on the second connection part and disposed at an inside with the second coil, a third board disposed on the third connection part and disposed at an inside with the third coil, and a fourth board disposed on the fourth connection part and disposed at an inside with the fourth coil.

The lens driving device may further comprise one or more magnetic sensors disposed at an inside of the board and spaced apart from the first coil, the second coil, the third coil and the fourth coil to detect at least one magnetic force of the first magnet, the second magnet, the third magnet and the fourth magnet.

The second housing may be moved to an optical axis direction by the electromagnetic interaction between the first magnet and the first coil, the bobbin may be moved to a first direction perpendicular to an optical axis by the electromagnetic interaction between the second magnet and the second coil, or tilted to a first direction perpendicular to an optical axis, the bobbin may be moved to a second direction perpendicular to both an optical axis and the first direction by the electromagnetic interaction between the third magnet and the third coil, or tilted to a second direction perpendicular to both the optical axis and the first direction, the aperture may comprise a stator comprising a first guide and a second guide, a mover disposed on the stator and disposed with the fourth magnet, a connecting rod rotatably connected at one side with the mover, a rotor rotatably connected to the other side of the connecting rod and rotatably connected at a center with the stator, a first blade disposed at one side of the rotor, and a second blade disposed at the other side of the rotor, wherein the first blade may comprise a first connection rod rotatably connected at one side to one side of the rotor, and moving along the first guide, and a first blocking plate disposed at the other side of the first connection rod and formed with a first groove, and the second blade may comprise a second connection rod rotatably connected at one side to the other side of the rotor, and moving along the second guide, and a second blocking plate disposed at the other side of the second connection rod and formed with a second groove, and wherein at least one portion of the first groove and the second groove may be overlapped to an optical axis direction, and an area of a hole formed by the first groove and the second groove may be adjusted by the electromagnetic interaction between the fourth magnet and the fourth coil.

The lens driving device may further comprise: one or more first ball bearings interposed between the first housing and the second housing; a moving member interposed between the second housing and the bobbin; one or more second ball bearings interposed between the moving member and the bobbin; and one or more third ball bearings interposed between the second housing and the moving member.

The lens driving device may further comprise a cover disposed at an inside of the first housing, the second housing, the bobbin, the aperture, the first coil, the second coil, the third coil, the fourth coil, the first magnet, the second magnet, the third magnet and the fourth magnet.

A camera module according to an exemplary embodiment of the present invention may comprise: a lens driving device; a lens module disposed on the lens driving device and comprising a plurality of lenses; a main board disposed underneath the lens driving device; and an image sensor mounted on the main board and disposed on an optical axis of the lens module, wherein the lens driving device may comprise: a first housing; a second housing disposed at an inside of the first housing; a bobbin disposed at an inside of the second housing; an aperture disposed on the bobbin or disposed at the bobbin; a first coil, a second coil, a third coil, and a fourth coil disposed on the first housing; a first magnet disposed on the second housing and disposed opposite to the first coil; a second magnet disposed on the bobbin and disposed opposite to the second coil; a third magnet disposed on the bobbin and disposed opposite to the third coil; and a fourth magnet disposed on the aperture and disposed opposite to the fourth coil, wherein the first coil, the second coil, the third coil, and the fourth coil are disposed to be spaced apart from each other; the first coil and the third coil are disposed opposite to each other with the first magnet and the third magnet interposed therebetween; and the second coil and the fourth coil are disposed opposite to each other with the second magnet and the fourth magnet interposed therebetween.

An optical apparatus according to an exemplary embodiment of the present invention may comprise: a frame; a display disposed at one surface of the frame; and a camera module disposed at an inside of the frame to be electrically connected with the display, wherein the camera module may comprise: a lens module disposed on a lens driving device to comprise a plurality of lenses; a main board disposed underneath the lens driving device; and an image sensor mounted on the main board and disposed on an optical axis of the lens module, and wherein the lens driving device may comprise: a first housing; a second housing disposed at an inside of the first housing; a bobbin disposed at an inside of the second housing; an aperture disposed on the bobbin or disposed at the bobbin; a first coil, a second coil, a third coil, and a fourth coil disposed on the first housing; a first magnet disposed on the second housing and disposed opposite to the first coil; a second magnet disposed on the bobbin and disposed opposite to the second coil; a third magnet disposed on the bobbin and disposed opposite to the third coil; and a fourth magnet disposed on the aperture and disposed opposite to the fourth coil, wherein the first coil, the second coil, the third coil, and the fourth coil are disposed to be spaced apart from each other; the first coil and the third coil are disposed opposite to each other with the first magnet and the third magnet interposed therebetween; and the second coil and the fourth coil are disposed opposite to each other with the second magnet and the fourth magnet interposed therebetween.

Advantageous Effects

The lens driving device according to an exemplary embodiment can perform all the auto focus function, the OIS function and the aperture driving function in response to an electromagnetic interaction between a coil disposed on the first housing and magnets respectively disposed on the second housing, the bobbin and the aperture, to allow having a compact structure. Furthermore, the embodiment of the present invention provides a camera module comprising the lens driving device and an optical apparatus comprising the camera module.

BRIEF DESCRIPTION OF DRAWINGS

FIG. 3 (a) is a perspective view conceptually illustrating a first housing according to an exemplary embodiment of the present invention, FIG. 3 (b), above, is a view of planar figure of a board seen from inside according to an exemplary embodiment of the present invention, and FIG. 3 (b), below, is a view of planar figure of a board seen from outside according to an exemplary embodiment of the present invention.

BEST MODE

Figure 1:
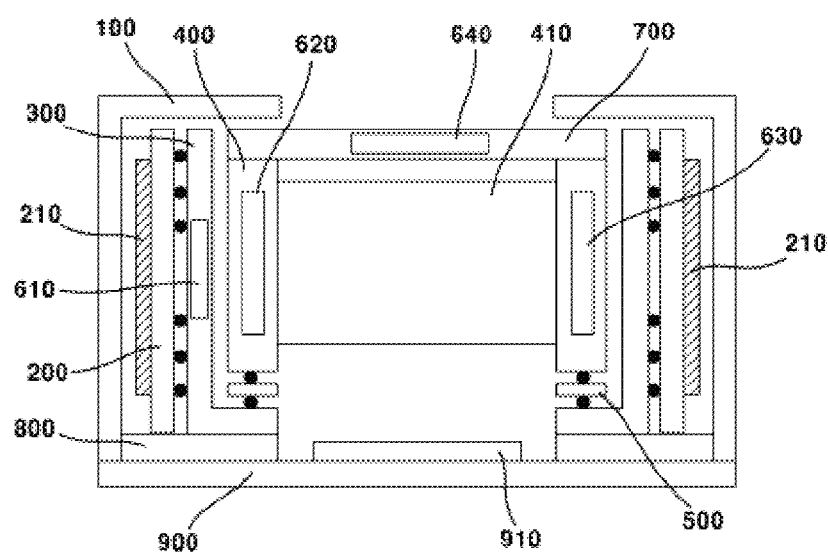
FIG. 1 is a cross-sectional view conceptually illustrating a camera module according to an exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings. Furthermore, well-known features or functions may be omitted or simplified in order not to obscure the embodiment being described.

In describing elements in the exemplary embodiments of the present invention, the terms of first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The hereinafter-used term of "optical axis" may be defined as an optical axis of a lens module coupled to a lens driving device. The "optical axis direction" may be parallel with z axis. The hereinafter-used term of "first direction"

may be defined as being perpendicular to an optical axis. The "first direction" may be parallel with x axis. The hereinafter-used term of "second direction" may be defined as being all perpendicular to an optical axis direction and a first direction. The "second direction" may be defined as being perpendicular to y axis.

However, it should be noted that the "optical axis", the "first direction" and the "second direction" are not limited to being mutually perpendicular. For example, the "optical axis" and the "first direction" may be slantly disposed at an angle other than 90°, and the "second direction" may be slantly disposed at an angle other than 90° for all the "optical axis", the "first direction".

The hereinafter-used term of 'auto focus function' may be defined as a function of matching a focus of a subject by adjusting a distance to an image sensor by moving a lens module to an optical axis direction according to a distance to the subject in order to allow obtaining a clear image of the subject from the image sensor. Meantime, the "auto focus function" may be interchangeably used with an "AF (Auto Focus) function".

The hereinafter-used term of 'handshake correction function' may be defined as a function of moving or tilting a lens module to a direction perpendicular to an optical axis (first direction or second direction) in order to offset a vibration (movement) on an image sensor generated by an external force. Meantime, the 'handshake correction function' may be interchangeably used with the 'OIS (Optical Image Stabilization)' function.

Hereinafter, a configuration of an "optical apparatus" according to an exemplary embodiment of the present invention will be described. The optical apparatus may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and any device capable of capturing an image or a photograph may be an optical apparatus.

The "optical apparatus" according to an exemplary embodiment of the present invention may comprise a frame which is an external member, a display panel disposed at one surface of the frame to display information and a camera module disposed at an inside of the frame. The camera module may photograph an image or a photograph and may be electrically connected to the display panel. An image photographed by the camera module may be reproduced by the display panel.

Figure 2:
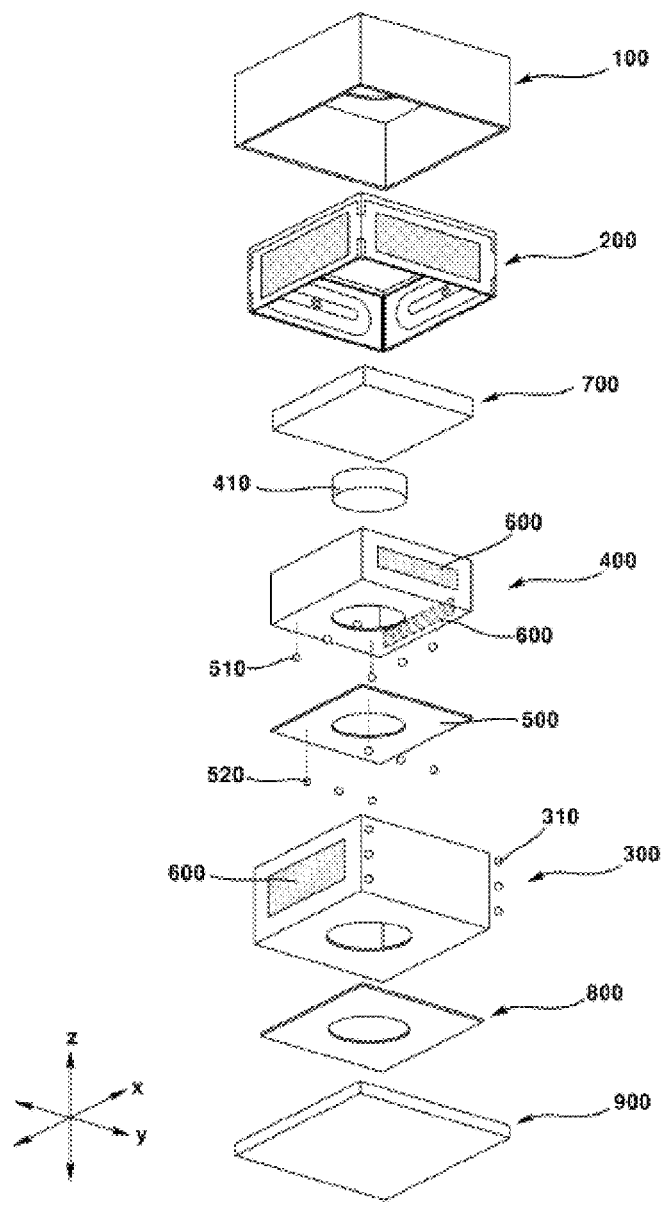
FIG. 2 is an exploded perspective view conceptually illustrating a camera module according to an exemplary embodiment of the present invention.
Figure 4:
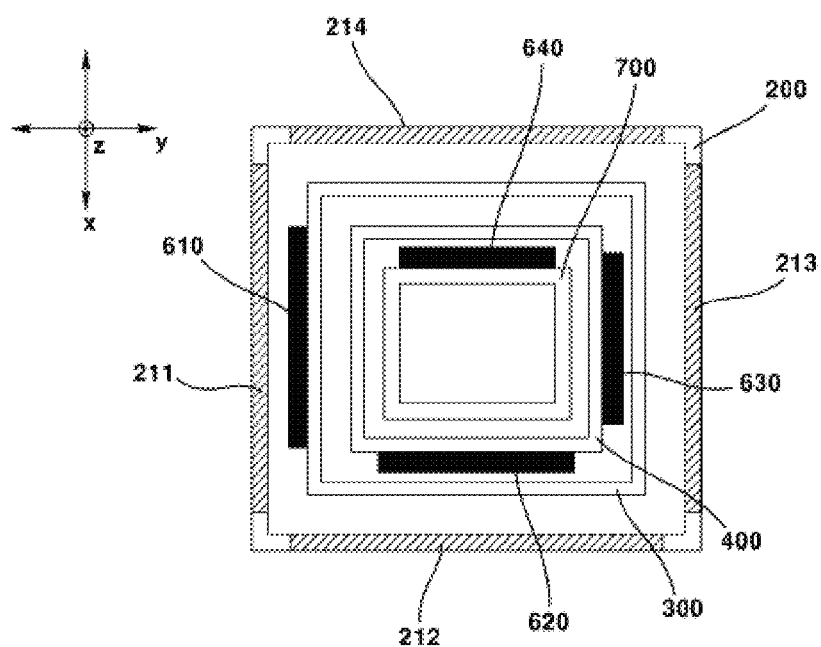
FIG. 4 is a plane view conceptually illustrating a first housing, a second housing, a bobbin, an aperture, a coil and a magnet according to an exemplary embodiment of the present invention.
Figure 5:
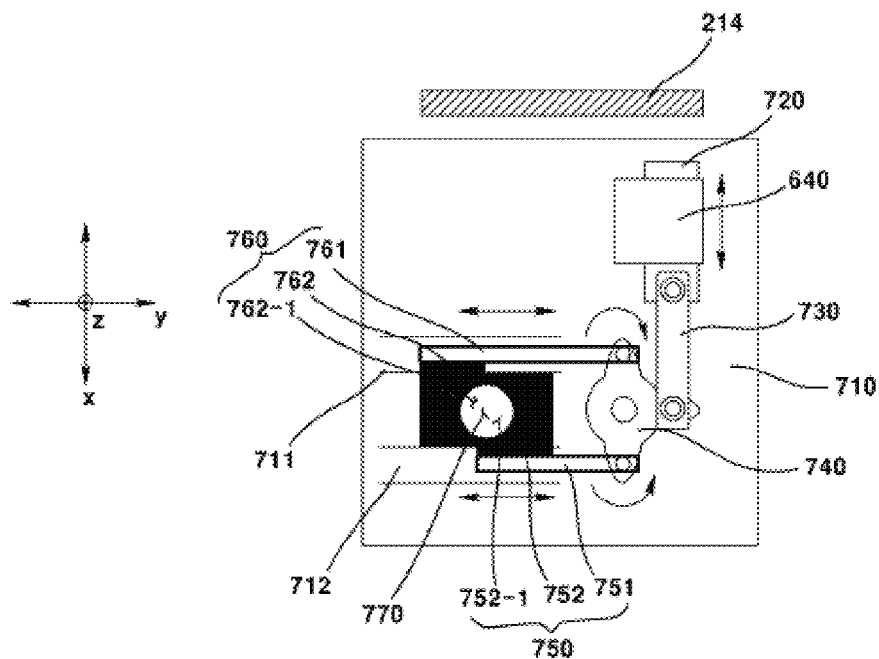
FIG. 5 is a plane view conceptually illustrating an aperture according to an exemplary embodiment of the present invention.

Now, the configuration of "camera module" according to an exemplary embodiment of the present invention will be described with reference to the accompanying drawings. FIG. 1 is a cross-sectional view conceptually illustrating a camera module according to an exemplary embodiment of the present invention, FIG. 2 is an exploded perspective view conceptually illustrating a camera module according to an exemplary embodiment of the present invention, FIG. 3 (*a*) is a perspective view conceptually illustrating a first housing according to an exemplary embodiment of the present invention, FIG. 3 (*b*), above, is a view of planar figure of a board seen from inside according to an exemplary embodiment of the present invention, and FIG. 3 (*b*), below, is a view of planar figure of a board seen from outside according to an exemplary embodiment of the present invention, FIG. 4 is a plane view conceptually illustrating a first housing, a second housing, a bobbin, an aperture, a coil and a magnet according to an exemplary embodiment of the present invention and FIG. 5 is a plane view conceptually illustrating an aperture according to an exemplary embodiment of the present invention.

The camera module (1000) may comprise a cover (100), a first housing (200), a coil (210), a board (220), a magnetic sensor (230), a yoke (240), a second housing (300), a first ball bearing (310), a bobbin (400), a lens module (410), a moving member (500), a second ball bearing (510), a third ball bearing (520), a magnet (600), an aperture (700), a base (800), a main board (900), an image sensor (910), an IR (Infrared) cut-off filter (not shown) and a controller (not shown).

The cover (100), the first housing (200), the coil (210), the board (220), the magnetic sensor (230), the yoke (240), the second housing (300), the first ball bearing (310), the bobbin (400), the lens module (410), the moving member (500), the second ball bearing (510), the third ball bearing (520), the magnet (600), the aperture (700) and the base (800) may be constitutional elements of a "lens driving device".

The cover (100) may be an external member of the "camera module (1000)" and the "lens driving device". An inside of the cover (100) may be disposed with a first housing (200), a coil (210), a board (220), a magnetic sensor (230), a yoke (240), a second housing (300), a first ball bearing (310), a bobbin (400), a lens module (410), a moving member (500), a second ball bearing (510), a third ball bearing (520), a magnet (600), an aperture (700) and a base (800). The cover (100) may be disposed thereunder with a main board (900) and an image sensor (910).

The cover (100) may comprise a metal material. The cover (100) may prevent an electromagnetic wave from being introduced into from outside or may prevent an electromagnetic wave from being discharged outside from inside. Therefore, the cover (100) may be called a "shield can". However, the material of the cover (100) is limited thereto, and the material of cover (100) may comprise plastic material, for example.

The cover (100) may take a square plate shape, and may centrally comprise an upper plate formed with a hole aligned with an optical axis, and four side plates downwardly extended from each side of the upper plate. The cover (100) may be formed at an upper surface by an upper plate of the cover (100) and a side plate of the cover (100) with a hole aligned with an optical axis, and may be formed with a lower-surface opened inner space. The hole of the upper plate at the cover (100) may be passed through by an outside light reflected by an object.

The cover (100) may be supported by the main board (900). A lower surface of the side plate at the cover (100) may be coupled with an upper surface of main board (900). A portion coupled by the cover (100) and the main board (900) may be coated with an adhesive. However, in a modification (not shown), the cover (100) may be supported by the base (800). In this case, the coupled relationship between the cover (100) and the base (800) may be inferably applied with a coupled relationship between the cover (100) and the main board (900) of the present exemplary embodiment.

The first housing (200) may be disposed at an inside of the cover (100). An inside of the first housing (200) may be disposed with a second housing (300), a first ball bearing (310), a bobbin (400), a lens module (410), a moving member (500), a second ball bearing (510), a third ball bearing (520), a magnet (600) and an aperture (700). The first housing (200) may be disposed with a coil (210), a board (220), a magnetic sensor (230) and a yoke (240). The first housing (200) may be disposed thereunder with a base (800) and a main board (900).

The first housing (200) may comprise a plastic material. The first housing (200) may be a plastic injection. However, the material of the first housing (200) may not be limited thereto.

The first housing (200) may comprise: a first corner (C1), a second corner (C2), a third corner (C3) and a fourth corner (C4), each mutually spaced apart; a first connection part (201) connecting the first corner (C1) and the second corner (C2); a second connection part (202) connecting the second corner (C2) and the third corner (C3); a third connection part (203) connecting the third corner (C3) and the fourth corner (C4); and a fourth connection part (204) connecting the fourth corner (C4) and the first corner (C1).

The first corner (C1) and the third corner (C3) may be symmetrically disposed about an optical axis. The second corner (C2) and the fourth corner (C4) may be spaced apart from the first corner (C1) and the third corner (C3), and may be symmetrically disposed about an optical axis. The first corner (C1) may be interposed between the first connection part (201) and the second connection part (202). The second corner (C2) may be interposed between the second connection part (202) and the third connection part (203). The third corner (C3) may be interposed between the third connection part (203) and the fourth connection part (204). The fourth corner (C4) may be interposed between the fourth connection part (204) and the first connection part (201).

The first connection part (201) and the third connection part (203) may be symmetrically disposed about an optical axis. The first connection part (201) and the third connection part (203) may be so disposed as to be correspondent (face, overlap) to a "second direction".

The second connection part (202) and the fourth connection part (204) may be interposed between the first connection part (201) and the third connection part (203), and may be symmetrically disposed about an optical axis. The second connection part (202) and the fourth connection part (204) may be so disposed as to be correspondent (face, overlap) to a "first direction".

The first connection part (201) and the third connection part (203) may be mutually and parallel disposed. The second connection part (202) and the fourth connection part (204) may be mutually and parallel disposed. The first connection part (201) and the third connection part (203) may be perpendicularly disposed with the second connection part (202) and the fourth connection part (204).

The first connection part (201) may be disposed with a first coil (211), a first board (221), a first magnetic sensor (231) and a first yoke (241). The second connection part (202) may be disposed with a second coil (212), a second board (222), a second magnetic sensor (232) and a second yoke (242). The third connection part (203) may be disposed with a third coil (213), a third board (223), a third magnetic sensor (233) and a third yoke (243). The fourth connection part (204) may be disposed with a fourth coil (214), a fourth board (224), a fourth magnetic sensor (234) and a fourth yoke (244).

A connection part of housing (200) may be a support member performing to support the coil (210), the board (220), the magnetic sensor (230) and the yoke (240).

The coil (210) may be formed in a plural number. The coil (210) may be disposed on the first housing (200). The coil (210) may be disposed on the board (220). The coil (210) may be electrically connected with the board (220). Each of the plurality of coils (210) may be so disposed as to be correspondent (face, overlap) with each of the magnets (600) to a "first direction" and to a "second direction". When a power is applied to the coil (210), the coil (210) may electromagnetically interact with the magnet (600). As a result, an auto focusing function, an OIS function and driving of aperture (700) may be implemented.

The plurality of coils (210) may comprise a first coil (211), a second coil (212), a third coil (213) and a fourth coil (214).

The first coil (211) may be a coil block wound with a conductive wire or a pattern coil formed on a board. The first coil (211) may be disposed on the first connection part (201) of the first housing (200). The first coil (211) may be disposed on the first board (221). The first coil (211) may be so disposed as to be correspondent (face, overlap) with the first magnet (610) to a "second direction". The first coil (211) may electromagnetically interact with the first magnet (610).

The second coil (212) may be a coil block wound with a conductive wire or a pattern coil formed on a board. The second coil (212) may be disposed on the second connection part (202) of the first housing (200). The second coil (212) may be disposed on the second board (222). The second coil (212) may be so disposed as to be correspondent (face, overlap) with the second magnet (620) to a "first direction". The second coil (212) may electromagnetically interact with the second magnet (620).

The third coil (213) may be a coil block wound with a conductive wire or a pattern coil formed on a board. The third coil (213) may be disposed on the third connection part (203) of the first housing (200). The third coil (213) may be disposed on the third board (223). The third coil (213) may be so disposed as to be correspondent (face, overlap) with the third magnet (630) to a "second direction". The third coil (213) may electromagnetically interact with the third magnet (630).

The fourth coil (214) may be a coil block wound with a conductive wire or a pattern coil formed on a board. The fourth coil (214) may be disposed on the fourth connection part (204) of the first housing (200). The fourth coil (214) may be disposed on the fourth board (224). The fourth coil (214) may be so disposed as to be correspondent (face, overlap) with the fourth magnet (640) to a "first direction". The fourth coil (214) may electromagnetically interact with the fourth magnet (640).

The first coil (211) and the third coil (213) may face each other across the first magnet (610) and the third magnet (630). The second coil (212) and the fourth coil (214) may face each other across the second magnet (620) and the fourth magnet (640).

The first coil (211), the second coil (212), the third coil (213) and the fourth coil (214) may be so similarly disposed as to be disposed along each side of a square. Furthermore, the first coil (211) may face the first magnet (610), the second coil (212) may face the second magnet (620), the third coil (213) may face the third magnet (630) and the fourth coil (214) may face the fourth magnet (640).

The foregoing arrangement may be advantageous to an arrangement where each of the plurality of coils (210) electromagnetically interact with a face magnet among the plurality of magnets (600), and at the same time, may be an arrangement minimally reducing the electromagnetic interference among adjacent magnets (600) with adjacent coils (210). Thus, the camera module (1000) according to an exemplary embodiment can perform an accurate auto focusing function, an OIS function and driving of an aperture (700).

The board (220) may be disposed on the first housing (200). The board (220) may be disposed with a coil (210), a magnetic sensor (230) and a yoke (240). The board (220) may be electrically connected with a coil (210) and may supply a power to the coil (210). The board (220) may be electrically connected to the magnetic sensor (230) and may receive a detection signal of the magnetic sensor (230). The board (220) may be electrically connected to a main board (900) to receive a power and various control signals from the main board (900), and transmit the detection signal of the magnetic sensor (230).

The board (220) may comprise a first board (221), a second board (222), a third board (223), a fourth board (224), a first connection board (225), a second connection board (226), a third connection board (227) and a fourth connection board (228).

The first board (221) may be a PCB (Printed Circuit Board). The first board (221) may be disposed on the first connection part (201) of housing (200). An inside surface of the first board (221) may be disposed with a first coil (211) and a first magnetic sensor (231). An outside surface of the first board (221) may be disposed with a first yoke (241).

The second board (222) may be a PCB (Printed Circuit Board). The second board (222) may be disposed on the second connection part (202) of housing (200). An inside surface of the second board (222) may be disposed with a second coil (212) and a second magnetic sensor (232). An outside surface of the second board (222) may be disposed with a second yoke (242).

The third board (223) may be a PCB (Printed Circuit Board). The third board (223) may be disposed on the third connection part (203) of housing (200). An inside surface of the third board (223) may be disposed with a third coil (213) and a third magnetic sensor (233). An outside surface of the third board (223) may be disposed with a third yoke (243).

The fourth board (224) may be a PCB (Printed Circuit Board). The fourth board (224) may be disposed on the fourth connection part (204) of housing (200). An inside surface of the fourth board (224) may be disposed with a fourth coil (214) and a fourth magnetic sensor (234). An outside surface of the fourth board (224) may be disposed with a fourth yoke (244).

The first connection board (225) may be an FPCB (Flexible Printed Circuit Board). The first connection board (225) may electrically connect the first board (221) with the second board (222). In a modification (not shown), the first connection board (225) may be changed by various conductive lines (e.g., a wire).

The second connection board (226) may be an FPCB (Flexible Printed Circuit Board). The second connection board (226) may electrically connect the second board (222) with the third board (223). In a modification (not shown), the second connection board (226) may be changed by various conductive lines (e.g., a wire).

The third connection board (227) may be an FPCB (Flexible Printed Circuit Board). The third connection board (227) may electrically connect the third board (223) with the fourth board (224). In a modification (not shown), the third connection board (227) may be changed by various conductive lines (e.g., a wire).

The fourth connection board (228) may be an FPCB (Flexible Printed Circuit Board). The fourth connection board (228) may electrically connect the fourth board (224) with the first board (221). In a modification (not shown), the fourth connection board (228) may be changed by various conductive lines (e.g., a wire).

The magnetic sensor (230) may be more than one. The magnetic sensor (230) may be disposed on the board (220). The magnetic sensor (230) may be electrically connected to the board (220). The magnetic sensor (230) may be so disposed as to be correspondent (face, overlap) with the magnet (600). The magnetic sensor (230) may be so disposed as to be correspondent (face, overlap) with the magnet (600) to a "first direction" and a "second direction".

The one or more magnetic sensors (230) may detect at least one magnetic force of the plurality of magnets (600). The magnetic sensor (230) may detect the magnetic force of the magnet (600) and output the detection signal. The main board (900) may process a magnetic signal of the magnetic sensor (230) and identify a position of the magnet (600), and an accurate auto focusing function, an OIS function and driving of aperture (500) can be performed (feedback control) based on the foregoing process and identification.

The one or more magnetic sensors (230) may comprise a first magnetic sensor (231), a second magnetic sensor (232), a third magnetic sensor (233) and a fourth magnetic sensor (234).

The first magnetic sensor (231) may be a "Hall sensor". The first magnetic sensor (231) may be disposed on the first connection part (201) of the first housing (200). The first magnetic sensor (231) may be spaced apart from the first coil (211) and may be disposed on the first board (221). The first magnetic sensor (231) may be correspondent (face, overlap) with the first magnet (610) to a "first direction". The first magnetic sensor (231) may detect a magnetic force of the first magnet (610), and may output a first detection signal in response thereto.

The second magnetic sensor (232) may be a "Hall sensor". The second magnetic sensor (232) may be disposed on the second connection part (202) of the first housing (200). The second magnetic sensor (232) may be spaced apart from the second coil (212) and may be disposed on the second board (222). The second magnetic sensor (232) may be correspondent (face, overlap) with the second magnet (620) to a "first direction". The second magnetic sensor (232) may detect a magnetic force of the second magnet (620), and may output a second detection signal in response thereto.

The third magnetic sensor (233) may be a "Hall sensor". The third magnetic sensor (233) may be disposed on the third connection part (203) of the first housing (200). The third magnetic sensor (233) may be spaced apart from the third coil (213) and may be disposed on the third board (223). The third magnetic sensor (233) may be correspondent (face, overlap) with the third magnet (630) to a "second direction". The third magnetic sensor (233) may detect a magnetic force of the third magnet (630), and may output a third detection signal in response thereto.

The fourth magnetic sensor (234) may be a "Hall sensor". The fourth magnetic sensor (234) may be disposed on the fourth connection part (204) of the first housing (200). The fourth magnetic sensor (234) may be spaced apart from the fourth coil (214) and may be disposed on the fourth board (224). The fourth magnetic sensor (234) may be correspondent (face, overlap) with the fourth magnet (640) to a "first direction". The fourth magnetic sensor (234) may detect a magnetic force of the fourth magnet (640), and may output a fourth detection signal in response thereto.

The yoke (240) may be formed with a plural number. The yoke (240) may be disposed on the board (220). The yoke (240) may be so disposed as to be correspondent (face, overlap) with the coil (210) and the magnet (600). Each of the plurality of yokes (240) may be correspondent (face, overlap) with each of the plurality of coils (210) and each of the plurality of magnets (600) to a "first direction" and a "second direction". The yoke (240) may concentrate or focus the electromagnetic force of coil (210) and magnetic force of the magnet (600) to allow the electromagnetic interaction between the coil (210) and the magnet to be smoothly performed.

The plurality of yokes (240) may comprise a first yoke (241), a second yoke (242), a third yoke (243) and a fourth yoke (244).

The first yoke (241) may be a plated type magnetic substance. The first yoke (241) may be disposed on the first connection part (201) of the first housing (200). The first yoke (241) may be disposed on the first board (221). The first yoke (241) may be correspondent (face, overlap) with the first coil (211) and the first magnet (610) to a "second direction". The first yoke (241) may concentrate or focus the electromagnetic force of first coil (211) and the magnetic force of the first magnet (610).

The second yoke (242) may be a plated type magnetic substance. The second yoke (242) may be disposed on the second connection part (202) of the first housing (200). The second yoke (242) may be disposed on the second board (222). The second yoke (242) may be correspondent (face, overlap) with the second coil (212) and the second magnet (620) to a "first direction". The second yoke (242) may concentrate or focus the electromagnetic force of second coil (212) and the magnetic force of the second magnet (620).

The third yoke (243) may be a plated type magnetic substance. The third yoke (243) may be disposed on the third connection part (203) of the first housing (200). The third yoke (243) may be disposed on the third board (223). The third yoke (243) may be correspondent (face, overlap) with the third coil (213) and the third magnet (630) to a "second direction". The third yoke (243) may concentrate or focus the electromagnetic force of third coil (213) and the magnetic force of the third magnet (630).

The fourth yoke (244) may be a plated type magnetic substance. The fourth yoke (244) may be disposed on the fourth connection part (204) of the first housing (200). The fourth yoke (244) may be disposed on the fourth board (224). The fourth yoke (244) may be correspondent (face, overlap) with the fourth coil (214) and the first magnet (640) to a "first direction". The fourth yoke (244) may concentrate or focus the electromagnetic force of fourth coil (214) and the magnetic force of the fourth magnet (640).

The second housing (300) may be disposed at an inside of the first housing (200). The inside of the second housing (300) may be disposed with a bobbin (400), a lens module (410), a moving member (500), a second ball bearing (510), a third ball bearing (520), a magnet (600) and an aperture (700). The second housing (300) may be disposed thereunder with a base (800) and a board (900).

The second housing (300) may take a square plate shape, and may be centrally formed with a lower plate formed with a hole aligned with an optical axis, and four side plates upwardly extended from each side of the lower plate. The second housing (300) may be formed at a lower surface with a hole aligned with an optical axis by the lower plate of the second housing (300) and the side plates of the second housing (300), and may be formed with an upper surface-opened inner space. The hole of the lower plate at the second housing (300) may be passed through by a light having passed through the lens module (410).

A plurality of first ball bearings (310) may be disposed between the second housing (300) and the first housing (200). The second housing (300) may be moved by the first ball bearing (310) to an "optical axis direction". That is, the second housing (300) may be movably connected with the first housing (200) to the "optical axis direction".

The second housing (300) may be disposed with a first magnet (610). A side plate correspondently (facingly, overlappingly) disposed with the first connection part (201) to the "second direction" among the side plates of the second housing (300) may be disposed with a first magnet (610). When a power is applied to the first coil (211) to allow the first coil (211) and the first magnet (610) to electromagnetically interact, the second housing (300) may be generated with a driving force to move to an "optical axis direction".

When the second housing (300) is moved to the "optical axis direction", the lens module (410) may be moved to the "optical axis direction" along with the second housing (300). The AF (Auto Focus) function may be implemented through this process.

The second housing (300) may comprise a plastic material. The second housing (300) may be a plastic injection. However, the material of the second housing (300) is not limited thereto.

The bobbin (400) may be disposed at an inside of the second housing (300). An inside of the bobbin (400) may be disposed with a lens module (410). The aperture (500) may be disposed inside of or above the bobbin (400). The bobbin (400) may be dispose thereunder with a moving member (500), a second ball bearing (510) and a third ball bearing (520).

The bobbin (400) may take a hollowed shape formed with a hole aligned with an optical axis. The hole of the bobbin (400) may be passed through a light having passed the hole at the upper plate of cover (100). A plurality of second ball bearings (510) may be interposed between the bobbin (400) and the moving member (500). The bobbin (400) may be moved by the second ball bearing (510) to the "first direction", or may be tilted to the "first direction". That is, the bobbin (400) may be so connected to the moving member (500) as to allow being moved to the "first direction" or being tilted to the "first direction".

The bobbin (400) may be disposed with the second magnet (620) and the third magnet (630). A side surface correspondently (facingly, overlappingly) disposed with the second connection part (202) of the housing (200) from the bobbin (400) to the "first direction" may be disposed with a second magnet (620). A side surface correspondently (facingly, overlappingly) disposed with the third connection part (203) of the housing (200) from the bobbin (400) to the "second direction" may be disposed with a third magnet (630).

When a power is applied to the second coil (212) to allow the second coil (212) and the second magnet (620) to electromagnetically interact, a driving force moving the bobbin (400) to the "first direction" or tilting the bobbin (400) to the "first direction" may be generated.

When a power is applied to the third coil (213) to allow the third coil (213) and the third magnet (630) to electromagnetically interact, a driving force moving the bobbin (400) to the "second direction" or tilting the bobbin (400) to the "second direction" may be generated.

When the bobbin (400) is moved or tilted to the "first direction", the lens module (410) may be moved or tilted to the "first direction" along with the bobbin (400). Through this process, an OIS function {OIS(x)} based on the "first direction (x axis)" may be implemented.

When the bobbin (400) is moved or tilted to the "second direction", the lens module (410) may be moved or tilted to the "second direction" along with the bobbin (400). Through this process, an OIS function {OIS(y)} based on the "second direction (y axis)" may be implemented.

The bobbin (400) may comprise a plastic material. The bobbin (400) may be a plastic injection. However, the material of the bobbin (400) is not limited thereto.

The lens module (410) may be disposed at an inside of bobbin (400). The lens module (410) may comprise a plurality of lenses and a lens barrel. However, one element of lens module (410) is not limited to the lens barrel, and any holder structure capable of supporting one or more lenses may be sufficient. A light having passed the lens module may be irradiated on the image sensor (910).

The moving member (500) may be disposed underneath the bobbin (400). The moving member (500) may be disposed above a lower plate of second housing. The moving member (500) may be interposed between the second housing (300) and the bobbin (400).

The moving member (500) may take a square plate shape centrally formed with a hole aligned with an optical axis. The hole of the moving member (500) may be passed through by a light having passed the hole of the bobbin (400).

The moving member (500) may comprise a plastic material. The moving member (500) may be a plastic injection. However, the material of the moving member (500) is not limited thereto.

A plurality of second ball bearings (510) may be interposed between the moving member (500) and the bobbin (400). The bobbin (400) may be moved or tilted by the second ball bearing (510) to the "first direction". That is, the bobbin (400) may be moveably or tiltably connected with the moving member (500) to the "first direction".

A plurality of third ball bearings (520) may be interposed between the moving member (500) and the second housing (300). The moving member (500) may be moved or tilted by the third ball bearing (520) to the "second direction". That is, the moving member (500) may be moveably or tiltably connected with the second housing (300) to the "second direction". The bobbin (400) may be moved or tilted by the moving member (500) to the "second direction".

The magnet (600) may be formed with a plural number. Each of the plurality of magnets (600) may be distributed and disposed on the second housing (300), the bobbin (400) and the aperture (700). Each of the plurality of magnets (600) may be correspondently (facingly, overlappingly) disposed with each of the plurality of coils (210) to the "first direction" or to the "second direction".

The magnet (600) may electromagnetically interact with the coil (210) to provide a driving force to the second housing (300) and the bobbin (400). The second housing (300) may be moved by the electromagnetic interaction between the magnet (600) and the coil (210) to the "optical axis direction" to perform the AF function. The bobbin (400) may be moved or tilted by the electromagnetic interaction between the magnet (600) and the coil (210) to the "first direction (x axis)" to perform an OIS function based on the "first direction (x axis)".

The bobbin (400) may be moved or tilted by the electromagnetic interaction between the magnet (600) and the coil (210) to the "second direction (y axis)" to perform an OIS function {(OIS (y)} based on the "second direction (y axis)".

The plurality of magnets (600) may comprise a first magnet (610), a second magnet (620), a third magnet (630) and a fourth magnet (600).

The first magnet (610) and the third magnet (630) may be symmetrically disposed about an "optical axis". The first magnet (610) and the third magnet (630) may be disposed parallel about the "first direction". The first magnet (610) and the third magnet (630) may be correspondingly (facingly, overlappingly) disposed at a mutual inner surface to the "second direction".

The second magnet (620) and the fourth magnet (640) may be spaced apart from the first magnet (610) and the third magnet (630).

The second magnet (620) and the fourth magnet (640) may be symmetrically disposed about an "optical axis". The second magnet (620) and the fourth magnet (640) may be disposed parallel about the "second direction". The second magnet (620) and the fourth magnet (640) may be correspondently (facingly, overlappingly) disposed at a mutual inner surface to the "first direction".

The first magnet (610) may be correspondently (facingly, overlappingly) disposed with the first coil (211) to the "second direction". The first magnet (610) may take a plated magnet shape correspondently (facingly, overlappingly) disposed at an outside surface with an inner surface of an inner surface to "second direction".

The first magnet (610) may electromagnetically interact with the first coil (211) to perform an AF (Auto Focus) function. The first magnet (610) may be formed on a side plate correspondently (facingly, overlappingly) disposed with the first connection part (201) among the side plates of the second housing (300) to the "second direction".

The second magnet (620) may be correspondingly (facingly, overlappingly) disposed with the second coil (212) to the "first direction". The second magnet (620) may take a plated magnet shape correspondingly disposed at an outside surface with an inner surface of the first coil (211) to the "first direction".

The second magnet (620) may electromagnetically interact with the second coil (212) to perform an OIS {OIS(x)} based on the "first direction (x axis)". The second magnet (620) may be disposed at a side surface correspondently (facingly, overlappingly) disposed with the second connection part (202) among the side surfaces of the bobbin (400) to the "first direction".

The third magnet (630) may be correspondingly (facingly, overlappingly) disposed with the third coil (213) to the "second direction". The third magnet (630) may be a plated magnet correspondingly (facingly, overlappingly) disposed at an outside surface with an inner side surface of the third coil (213).

The third magnet (630) may electromagnetically interact with the third coil (213) to perform an OIS {OIS (y)} based on the "second direction". The third magnet (630) may be formed on a side surface correspondingly (facingly, overlappingly) disposed with the third connection part (203) among the side surfaces of bobbin (400) to the "second direction".

The fourth magnet (640) may be correspondingly (facingly, overlappingly) disposed with the fourth coil (214) to the "first direction". The fourth magnet (640) may be a plated magnet correspondently (facingly, overlappingly) disposed at an outside surface with an inner surface of the fourth coil (214) to the "second direction". The fourth magnet (640) may perform the driving of aperture (700) by electromagnetically interacting with the fourth coil (214).

The aperture (700) may be disposed on or at the bobbin (400). When the aperture (700) is disposed at the bobbin (400)(not shown), the aperture 3 (700) may be disposed among the plurality of lenses of the lens module (410). The aperture (700) may be disposed with the fourth magnet (640).

The aperture (700) may comprise a stator (710) comprising a first guide (711) and a second guide (712), a mover (720) disposed on the stator (710) and disposed with the fourth magnet (640), a connecting rod (730) rotatably connected at one side to the mover (720), a rotor (740) rotatably connected to the other side of the connecting rod (730) and rotatably connected at a center with the stator (710), a first blade (750) disposed at one side of the rotor (740), and a second blade (760) disposed at the other side of the rotor (740).

The mover (720) may be moved to the "first direction" in response to the electromagnetic interaction between the fourth coil (214) and the fourth magnet (640). In order to facilitate the movement of the mover (720), a plurality of fourth ball bearings (not shown) may be interposed between the stator (710) and the mover (720).

The driving force may be transmitted to the rotor (740) through the connecting rod (730) by the movement of mover (720) to the "first direction". The rotor (740) may be rotated to the forward direction or to the backward direction, and the first blade (750) and the second blade (760) may be moved to the "second direction" by the rotation of the rotor (740).

The first blade (750) may comprise a first connecting rod (751) rotatably connected at one side to one side of the rotor (740) and moving along the first guide (711), and a first blocking plate (752) disposed at the other side of the first connecting rod (751) and formed with a first groove (752-1).

The second blade (760) may comprise a second connecting rod (762) rotatably connected at one side to the other side of the rotor (740) and moving along the second guide (712), and a second blocking plate (762) disposed at the other side of the second connecting rod (762) and formed with a second groove (762-1).

At least one portion of the first groove (752-1) and the second groove (762-1) may be overlapped to the optical axis direction, and the first groove (752-1) and the second groove (762-1) may form a hole (770). An area of hole (770) formed by the first groove (752-1) and the second groove (762-1) may be adjusted by allowing the first blade (750) and the second blade (750) to be moved to the "second direction". That is, the area of hole (770) formed by the first groove (752-1) and the second groove (762-1) may be adjusted by electromagnetic interaction between the fourth coil (214) and the fourth magnet (640).

The aperture (700) may adjust an amount of light irradiated on the image sensor (910).

The base (800) may be disposed on the main board (900). The base (800) may be disposed underneath the first housing (200), the second housing (300), the bobbin (400) and the moving member (500). An upper surface of base (800) may be brought into contact with a lower surface of first housing (200) and a lower surface of lower plate of the second housing (300). That is, the base (800) may be a member supporting and fixing the first housing (200), the second housing (300), the bobbin (400) and the moving member (500).

The base (800) may take a square plate shape centrally formed with a hole to an optical axis direction. The hole of the base (800) may be passed by a light having passed the lens module (410) and the hole (770) of aperture (700). The light having passed the hole of base (800) may be irradiated on the image sensor (910).

The main board (900) may be a PCB (Printed Circuit Board). The main board (900) may be disposed underneath the cover (100), the first housing (200), the coil (210), the board (220), the magnetic sensor (230), the yoke (240), the second housing (300), the first ball bearing (310), the bobbin (400), the lens module (410), the moving member (500), the second ball bearing (510), the third ball bearing (520), the magnet (600), the aperture (700) and the base (800).

The main board (900) may be disposed with an image sensor (910) by being aligned with an optical axis. The main board (900) may be mounted with an image sensor (910). For instance, an inner upper surface of main board (900) may be disposed with the image sensor (910), and an outer upper surface of main board (900) may be disposed with the cover (100) and the base (800). Through this structure, a light having passed the lens module (410), the hole (770) of aperture and the hole of the base (800) may be irradiated on the image sensor. The main board (900) may supply a power to the camera module (1000) (e.g., supply of power to the coil). The main board (900) may be mounted with a controller in order to control the camera module (1000).

The image sensor (910) may output the irradiated light as an image signal. The image signal outputted by the image sensor may be transmitted to a display part (display panel) of an optical apparatus through main board (910). The image sensor (910) may be a CCD (charge coupled device), a MOS (metal oxide semi-conductor), a CPD and a CID. However, the kinds of image sensor (910) are not limited thereto.

An IR cut-off filter may cut off a light of infrared region from being incident on the image sensor (910). The IR cut-off filter may be interposed between the lens module (410) and the image sensor (910), for example. The IR cut-off filter may be disposed on a holder member (not shown) separately formed away from the base (800). However, the IR cut-off filter may be mounted on a hole formed at a central part of the base (800). The IR cut-off filter may be formed with a film material or a glass material, for example. The IR cut-off filter may be formed by allowing an IR cut-off coating material to be coated on a plate shaped optical filter such as cover glass for protecting a surface of image pickup device and cover glass, for example.

The controller may be mounted on the main board (900). However, the position of the controller is not limited thereto. The controller may be disposed at an outside of camera module (1000). The controller may control the direction, intensity and amplitude of current supplied to each element forming the camera module (1000). The controller may control the camera module (1000) to perform the AF function, the OIS function and the driving of aperture (700).

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "comprises", "comprising", "have", "having", "comprises" and/or "comprising" as used herein mean that the relevant elements are embedded, unless otherwise described, such that the mentioned elements are not excluded but may be further comprised.

Unless otherwise defined, all terms comprising technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being comprised in the scope of right of the present invention.

The invention claimed is:

1. A lens driving device, comprising:
   a first housing;
   a second housing disposed in the first housing;
   a bobbin disposed in the second housing;
   an aperture disposed on the bobbin;
   a board disposed on the first housing;
   first to fourth coils disposed on the board;
   a first magnet disposed on the second housing and disposed to correspond to the first coil;
   a second magnet disposed on the bobbin and disposed to correspond to the second coil;
   a third magnet disposed on the bobbin and disposed to correspond to the third coil;
   a fourth magnet disposed on the aperture and disposed to correspond to the fourth coil; and
   a fourth sensor disposed on the board and configured to sense the fourth magnet,
   wherein the first to fourth coils are spaced apart from each other, the first coil and the third coil are disposed opposite to each other, and the second coil and the fourth coil are disposed opposite to each other,
   wherein the second housing is configured to move in an optical axis direction by the first magnet and the first coil,
   wherein the bobbin is configured to move in a first direction perpendicular to the optical axis direction by the second magnet and the second coil,
   wherein the bobbin is configured to move in a second direction perpendicular to both the optical axis direction and the first direction by the third magnet and the third coil,
   wherein the aperture comprises a first blade and a second blade, and
   wherein an area of a hole defined by the first blade and the second blade is configured to be adjusted by the fourth magnet and the fourth coil.

2. The lens driving device of claim 1, wherein the first coil and the third coil are disposed opposite to each other based on an optical axis.

3. The lens driving device of claim 2, wherein the second coil and the fourth coil are disposed opposite to each other based on the optical axis.

4. The lens driving device of claim 1, wherein the first coil, the first magnet, the third magnet and the third coil are overlapped.

5. The lens driving device of claim 4, wherein the second coil, the second magnet, the fourth magnet and the fourth coil are overlapped.

6. The lens driving device of claim 1, wherein the board comprises first to fourth boards, and a connection board connecting the first to fourth boards,
   wherein the first coil is disposed on the first board,
   wherein the second coil is disposed on the second board,
   wherein the third coil is disposed on the third board, and
   wherein the fourth coil is disposed on the fourth board.

7. The lens driving device of claim 1, wherein the board comprises first to fourth boards,
   wherein the lens driving device comprises:
      a first sensor disposed on the first board and configured to sense the first magnet;
      a second sensor disposed on the second board and configured to sense the second magnet; and
      a third sensor disposed on the third board and configured to sense the third magnet, and
   wherein the fourth sensor is disposed on the fourth board.

8. The lens driving device of claim 1, wherein the first housing comprises:
   a first corner, a second corner, a third corner and a fourth corner, each mutually spaced apart from the other;
   a first connection part connecting the first corner and the second corner;
   a second connection part connecting the second corner and the third corner;
   a third connection part connecting the third corner and the fourth corner; and
   a fourth connection part connecting the four corner and the first corner, and
   wherein the first coil is disposed on the first connection part, the second coil is disposed on the second connection part, the third coil is disposed on the third connection part and the fourth coil is disposed on the fourth connection part.

9. The lens driving device of claim 8, wherein the first to fourth coils are disposed on an inner lateral surface of the board.

10. The lens driving device of claim 9, wherein the board is disposed on the first connection part, the second connection part, the third connection part and the fourth connection part.

11. The lens driving device of claim 1, wherein the aperture is configured to adjust an amount of light passing through the aperture by the fourth magnet and the fourth coil.

12. The lens driving device of claim 1, wherein the aperture comprises a stator comprising a first guide and a second guide, a mover disposed on the stator and disposed with the fourth magnet, a connecting rod rotatably connected at one side with the mover, and a rotor rotatably connected to the other side of the connecting rod and rotatably connected at a center with the stator,
   wherein the first blade is disposed at one side of the rotor, and
   wherein the second blade is disposed at the other side of the rotor.

13. The lens driving device of claim 12, wherein the first blade comprises a first connection rod rotatably connected at one side to one side of the rotor and moving along the first guide, and a first blocking plate disposed at the other side of the first connection rod and formed with a first groove,
   wherein the second blade comprises a second connection rod rotatably connected at one side to the other side of the rotor, and moving along the second guide, and a second blocking plate disposed at the other side of the second connection rod and formed with a second groove, and
   wherein the first groove and at least one portion of the second groove are overlapped to an optical axis direction.

14. The lens driving device of claim 13, wherein the hole defined by the first blade and the second blade is a hole formed by the first groove and the second groove.

15. The lens driving device of claim 1, comprising one or more first ball bearings disposed between the first housing and the second housing.

16. The lens driving device of claim 1, comprising:
a moving member disposed between the second housing and the bobbin;
one or more second ball bearings disposed between the moving member and the bobbin; and
one or more third ball bearings disposed between the second housing and the moving member.

17. A camera module comprising:
a printed circuit board (PCB);
an image sensor disposed on the PCB;
the lens driving device of claim 1 disposed on the PCB; and
a lens coupled to the bobbin of the lens driving device.

18. An optical apparatus comprising:
a frame;
a display disposed on one surface of the frame; and
the camera module of claim 17 disposed on the frame and electrically connected with the display.

19. A lens driving device, comprising:
a first housing;
a second housing disposed in the first housing;
a bobbin disposed in the second housing;
an aperture disposed on the bobbin;
a board disposed on the first housing;
first to fourth coils disposed on the board;
a first magnet disposed on the second housing and facing the first coil;
a second magnet disposed on the bobbin and facing the second coil;
a third magnet disposed on the bobbin and facing the third coil;
a fourth magnet disposed on the aperture and facing the fourth coil;
a first sensor disposed on the board and configured to sense the first magnet;
a second sensor disposed on the board and configured to sense the second magnet;
a third sensor disposed on the board and configured to sense the third magnet; and
a fourth sensor disposed on the board and configured to sense the fourth magnet,
wherein the first to fourth coils are spaced apart from each other, the first coil and the third coil are disposed opposite to each other, and the second coil and the fourth coil are disposed opposite to each other,
wherein the second housing is configured to move in an optical axis direction by the first magnet and the first coil,
wherein the bobbin is configured to move in a first direction perpendicular to the optical axis direction by the second magnet and the second coil,
wherein the bobbin is configured to move in a second direction perpendicular to both the optical axis direction and the first direction by the third magnet and the third coil,
wherein the aperture comprises a first blade comprising a first groove and a second blade comprising a second groove, and
wherein an area of a hole formed by the first groove and the second groove is configured to be adjusted by the fourth magnet and the fourth coil.

20. The lens driving device of claim 19, wherein the first coil and the third coil are disposed opposite to each other based on an optical axis, and
wherein the second coil and the fourth coil are disposed opposite to each other based on the optical axis.

* * * * *